United States Patent
Kupferman (10) Patent No.: US 8,116,023 B1
(45) Date of Patent: Feb. 14, 2012

(54) DISK DRIVE COMPRISING PREAMBLE ALIGNED ZONED SERVO SECTORS

(75) Inventor: Hanan Kupferman, Diamond Bar, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 271 days.

(21) Appl. No.: 12/335,291

(22) Filed: Dec. 15, 2008

(51) Int. Cl.
*G11B 5/09* (2006.01)
*G11B 5/596* (2006.01)

(52) U.S. Cl. .................. 360/51; 360/48; 360/77.08
(58) Field of Classification Search .................. None
See application file for complete search history.

(56) References Cited

U.S. PATENT DOCUMENTS

| | | | |
|---|---|---|---|
| 5,384,671 A * | 1/1995 | Fisher | 360/51 |
| 5,418,659 A | 5/1995 | Shergill | |
| 5,796,535 A | 8/1998 | Tuttle et al. | |
| 5,956,196 A | 9/1999 | Hull et al. | |
| 6,084,738 A | 7/2000 | Duffy | |
| 6,118,604 A | 9/2000 | Duffy | |
| 6,178,056 B1 | 1/2001 | Cloke et al. | |
| 6,262,857 B1 | 7/2001 | Hull et al. | |
| 6,388,829 B1 | 5/2002 | Nazarian | |
| 6,411,452 B1 | 6/2002 | Cloke | |
| 6,441,981 B1 | 8/2002 | Cloke et al. | |
| 6,515,813 B2 * | 2/2003 | Kitazaki et al. | 360/51 |
| 7,012,773 B2 | 3/2006 | Ashikaga et al. | |
| 7,054,083 B2 | 5/2006 | Ehrlich | |
| 7,212,364 B1 * | 5/2007 | Lee | 360/51 |
| 7,405,893 B2 * | 7/2008 | Bi et al. | 360/48 |
| 2007/0064325 A1 | 3/2007 | Bi et al. | |

* cited by examiner

*Primary Examiner* — Daniell L Negron (57) ABSTRACT

A disk drive is disclosed comprising a disk comprising a plurality of servo sectors defining a plurality of servo tracks, and a head actuated radially over the disk for generating a read signal. Each servo sector comprises a preamble comprising a first end and a second end, and each servo sector comprises a servo sync mark after the second end of the preamble. The servo tracks form a plurality of servo zones, wherein a servo data rate of the servo sectors in a first servo zone is different than a servo data rate of the servo sectors in a second servo zone. The first end of the preambles in the servo sectors are aligned along a radius of the disk across at least the first servo zone and the second servo zone.

8 Claims, 8 Drawing Sheets

DISK DRIVE COMPRISING PREAMBLE ALIGNED ZONED SERVO SECTORS

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate of the data sectors is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. The prior art has also suggested to record the servo sectors at a varying data rate across the radius of the disk in order to improve format efficiency. Similar to the data sectors, the servo sectors are banded together to form a number of servo zones.

DETAILED DESCRIPTION OF EMBODIMENTS OF THE INVENTION

Figure 1A:
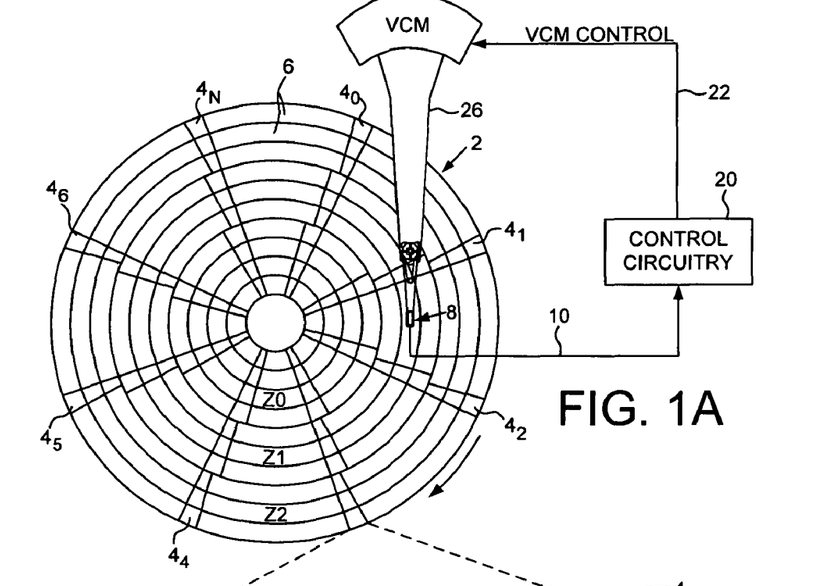
FIG. 1A shows a disk drive according to an embodiment of the present invention comprising a disk with a plurality of servo sectors having preambles aligned across multiple servo zones, a head actuated over the disk, and control circuitry.
Figure 1B:
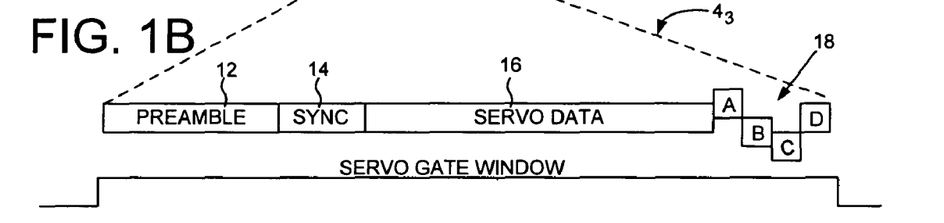
FIG. 1B shows a format of a servo sector according to an embodiment of the present invention and a servo gate window generated when demodulating the servo sector.

FIG. 1A shows a disk drive according to an embodiment of the present invention comprising a disk 2 having a plurality of servo sectors $4_0$-$4_N$ defining a plurality of servo tracks 6, and a head 8 actuated radially over the disk 2 for generating a read signal 10. FIG. 1B shows an example format of a servo sector $4_3$ including a preamble 12 comprising a periodic pattern for enabling proper gain adjustment and timing synchronization of the read signal 10. The preamble 12 comprises a first end and a second end, wherein a servo sync mark 14 is recorded after the second end of the preamble 12. The servo tracks 6 form a plurality of servo zones (e.g., servo zones Z0, Z1, Z2), wherein a servo data rate of the servo sectors in a first servo zone is different than a servo data rate of the servo sectors in a second servo zone. The first end of the preambles 12 in the servo sectors are aligned along a radius of the disk 2 across at least the first servo zone and the second servo zone.

In the embodiment of FIG. 1B, the sync mark 14 in each servo sector 4, comprises a special pattern used to symbol synchronize to a servo data field 16. The servo data field 16 stores coarse head positioning information, such as a track address, used to position the head over a target data track during a seek operation. Each servo sector 4, further comprises groups of servo bursts 18 (e.g., A, B, C and D bursts), which comprise a number of consecutive transitions recorded at precise intervals and offsets with respect to a data track centerline. The groups of servo bursts 18 provide fine head position information used for centerline tracking while accessing a data track during write/read operations.

The servo sectors $4_0$-$4_N$ may be written to the disk 2 using any suitable technique, such as with an external servo writer, a media writer, or using the control circuitry 20 within each disk drive to self-servo write the servo sectors $4_0$-$4_N$. Self servo writing may involve propagating the servo sectors to servo the head radially over the disk, or by processing seed patterns (e.g., spiral seed patterns) to servo the head radially over the disk. When using an external servo writer, media writer, or self-servo writing technique, a disk-locked clock is typically synchronized to the rotation of the disk (e.g., using a clock track), wherein the disk-locked clock is used to write the servo sectors at the appropriate circumferential location so that the preambles 12 are aligned as shown in FIG. 1A. In yet another embodiment, the servo sectors $4_0$-$4_N$ may be stamped onto the surface of the disk using a master stamping disk (i.e., servo pattern printing), or the servo sectors $4_0$-$4_N$ may be etched onto the surface of the disk so as to have the desired radially aligned preambles 12 as shown in FIG. 1A.

In the embodiment of FIG. 1A, the control circuitry 20 processes the read signal 10 emanating from the head 8 to demodulate the servo sectors $4_0$-$4_N$ into a position error signal (PES). The PES is filtered with a suitable compensation filter to generate a control signal 22 applied to a voice coil motor (VCM) 24 which rotates an actuator arm 26 about a pivot in order to position the head 8 radially over the disk 2 in a direction that reduces the PES.

Figure 1C:
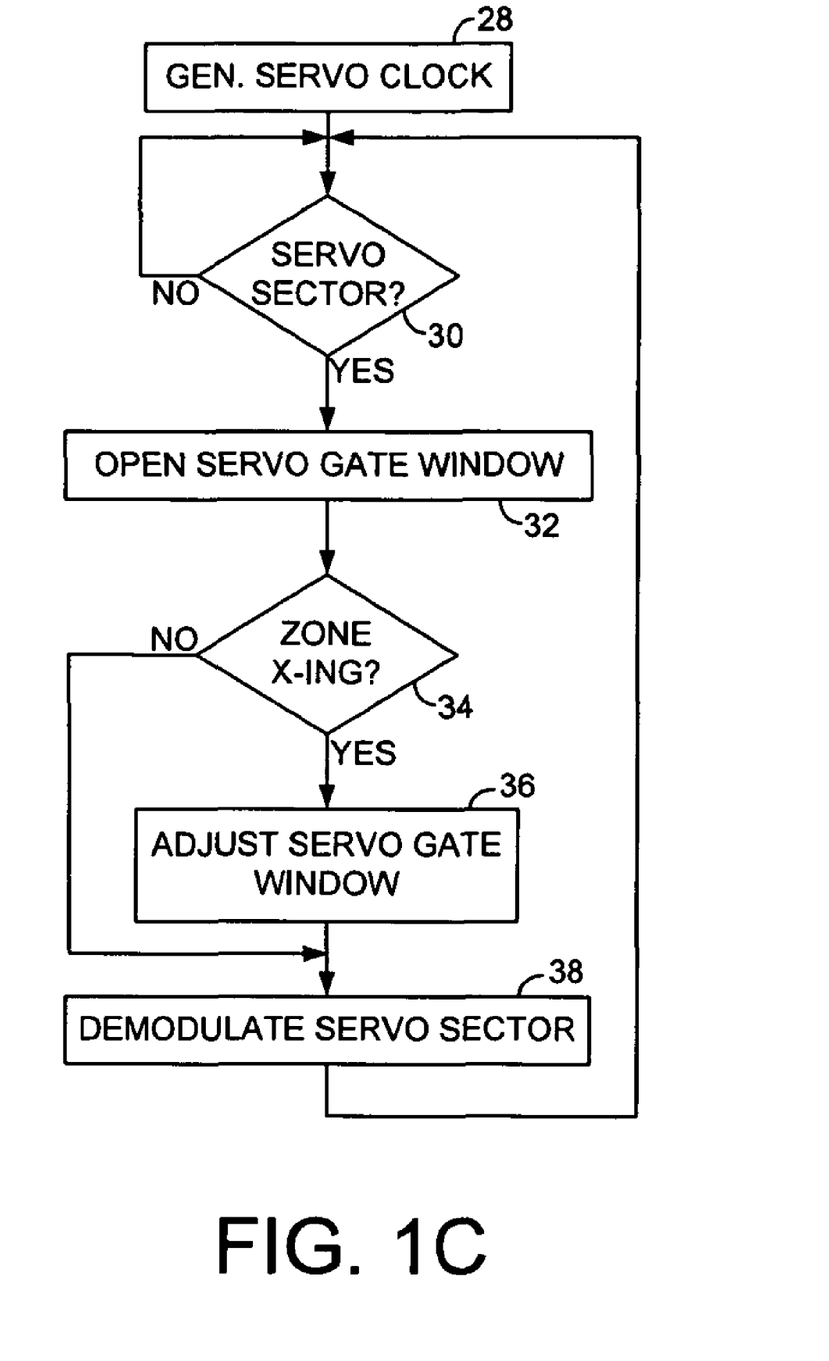
FIG. 1C is a flow diagram according to an embodiment of the present invention wherein the servo gate window is adjusted when the head crosses a servo zone boundary.

FIG. 1C is a flow diagram executed by the control circuitry 20 according to an embodiment of the present invention wherein a servo clock is generated for servoing the head (step 28). When the head 8 approaches a servo sector (step 30), a servo gate window is opened (step 32). If the control circuitry 20 determines that the head 8 has crossed over a servo zone boundary (step 34), the servo gate window is adjusted accordingly (step 36) and the servo sector demodulated (step 38).

Figure 2A:
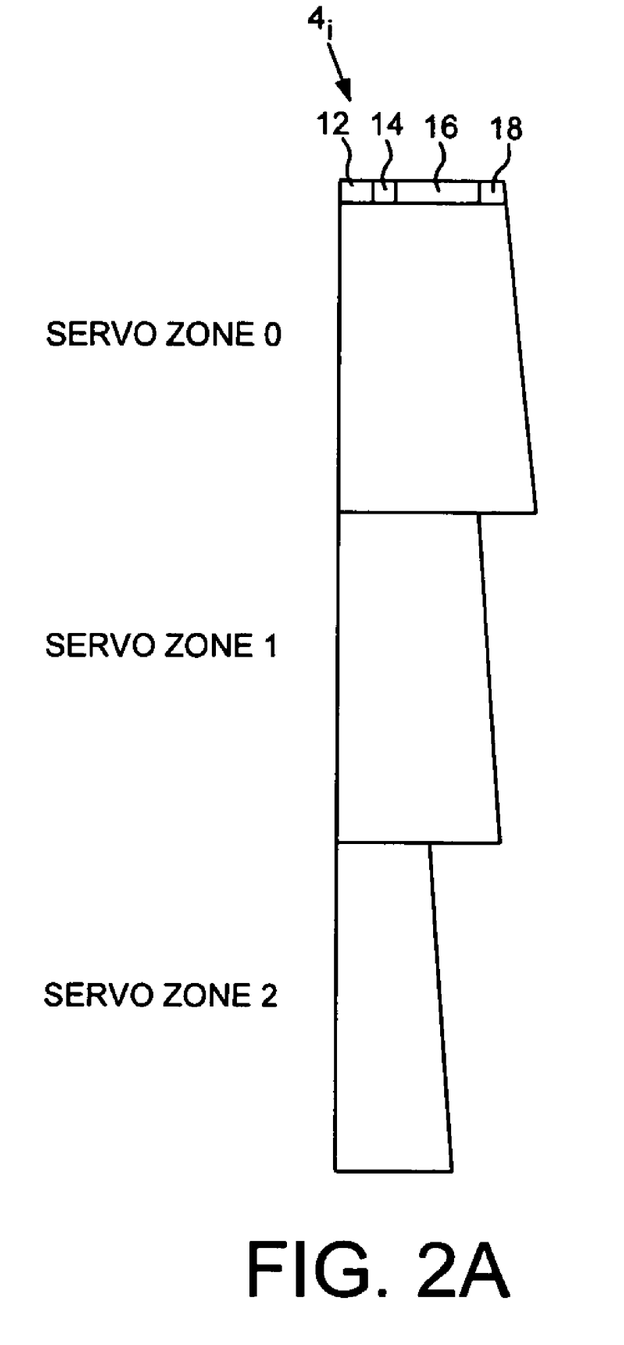
FIG. 2A shows a magnified view of the physical dimensions of the servo sectors across the three servo zones shown in FIG. 1A according to an embodiment of the present invention.

FIG. 2A shows a magnified view of the physical dimensions of the servo sectors 4, across the three servo zones in the embodiment of FIG. 1A, wherein the preambles 12 in the servo sectors are aligned along a radius of the disk across the three servo zones Z0-Z2. Since the data rate increases toward the outer diameter tracks, the physical width of the servo sectors decreases toward the outer diameter servo zones as illustrated by the trapezoidal-shaped servo sectors in FIG. 2A. On the other hand, the physical width of the servo sectors within a zone typically increases towards the outer diameter of the zone.

Figure 2B:
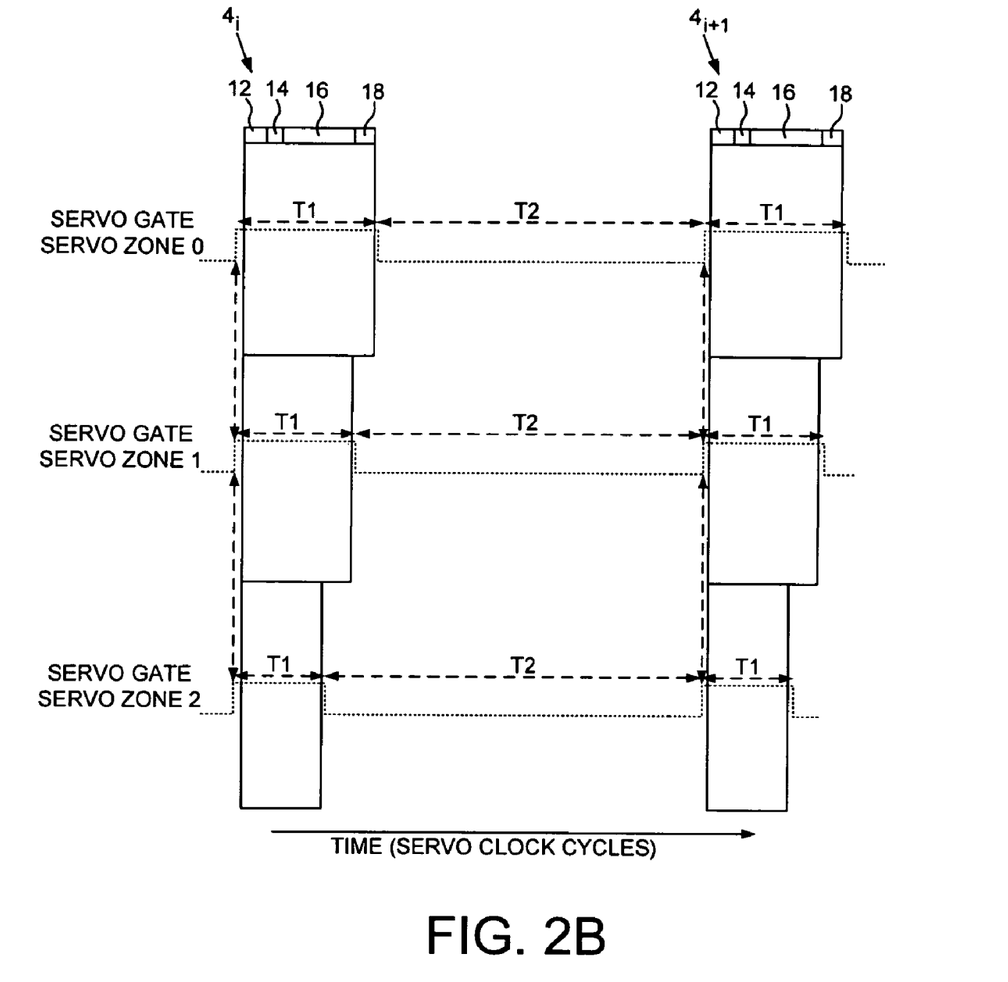
FIG. 2B illustrates how the servo gate window is adjusted relative to three servo zones according to an embodiment of the present invention.

FIG. 2B illustrates how the servo gate window is adjusted for each servo zone. When the head crosses over a servo zone boundary, the servo gate window is adjusted to account for the change in the data rate of servo sectors. The x-axis of FIG. 2B represents time in the form of servo clock cycles, and therefore the servo sectors 4, in each servo zone are shown as having a rectangular shape.

In one embodiment, the servo gate window is generated using a fixed rate servo clock. With a fixed rate servo clock, the T1 interval (the interval the servo gate window is open) plus the T2 interval (the interval between servo gate windows) is substantially constant (constant number of servo clock cycles) across the radius of the disk. When the head crosses a servo zone boundary, the end of the servo gate window is adjusted to account for the change in the physical width of the servo sectors. For example, if in FIG. 2B the head transitions from servo zone 0 to servo zone 1, the T1 interval is reduced in order to adjust the end of the servo gate window, and the T2 interval is increased accordingly.

In another embodiment, the servo gate window is generated using a disk locked servo clock (a servo clock synchronized to the servo data rate). With a disk locked servo clock, the T1 interval (in servo clock cycles) remains substantially constant across the radius of the disk, whereas the T2 interval is adjusted. For example, if in FIG. 2B the head transitions from servo zone 0 to servo zone 1, the T1 interval remains the same (in servo clock cycles), whereas the T2 interval is increased to account for the increased recording space between servo sectors.

Figure 3A:
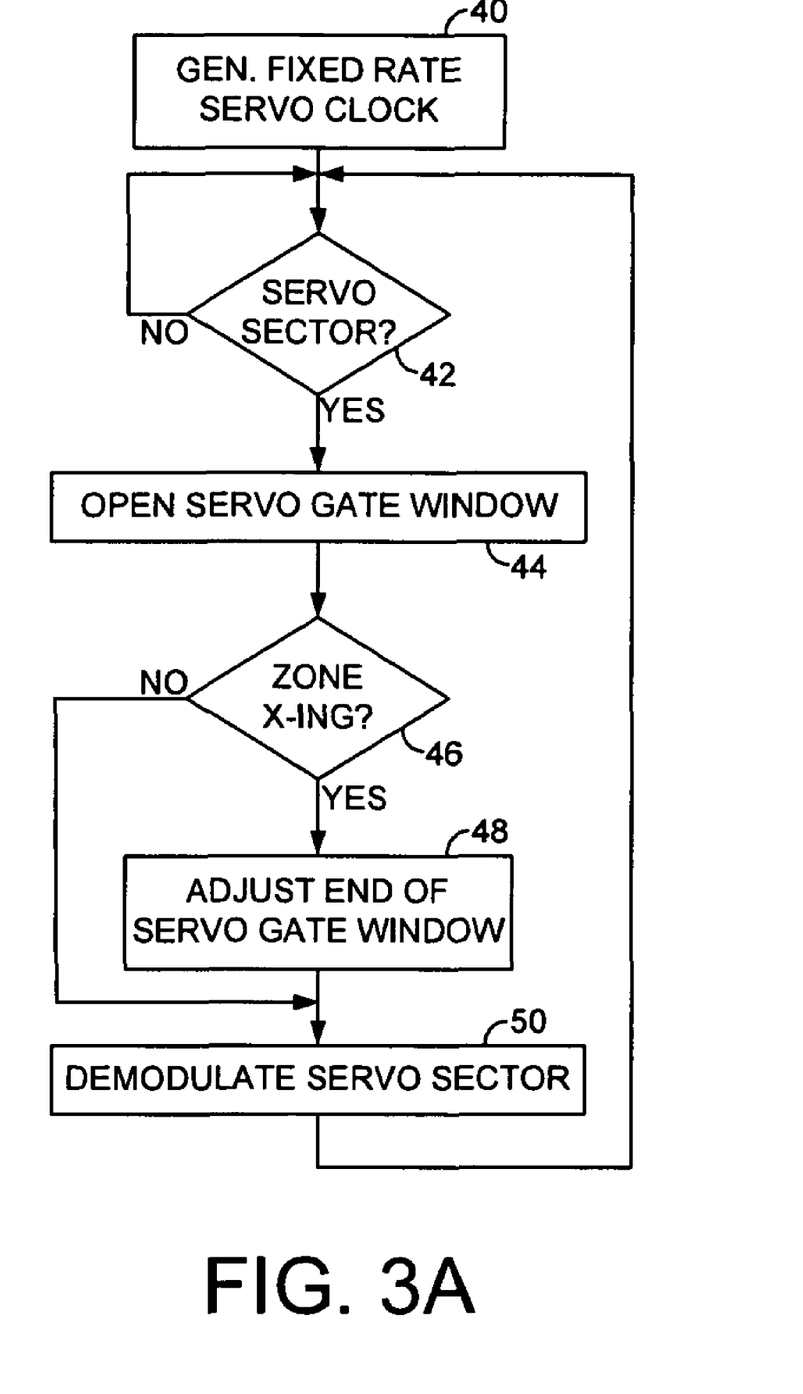
FIG. 3A is a flow diagram according to an embodiment wherein a fixed rate servo clock is used to generate the servo gate window, and the end of the servo gate window is adjusted when the head crosses a servo zone boundary.

FIG. 3A is a flow diagram according to an embodiment of the present invention wherein a fixed rate servo clock is generated (step 40), and when the head approaches a servo sector (step 42), the fixed rate servo clock is used to open the servo gate window (step 44). When the head crosses a servo zone boundary (step 46), the end of the servo gate window is adjusted (step 48) to account for the change in the physical width of the servo sectors, and the servo sector is demodulated (step 50).

Figure 3B:
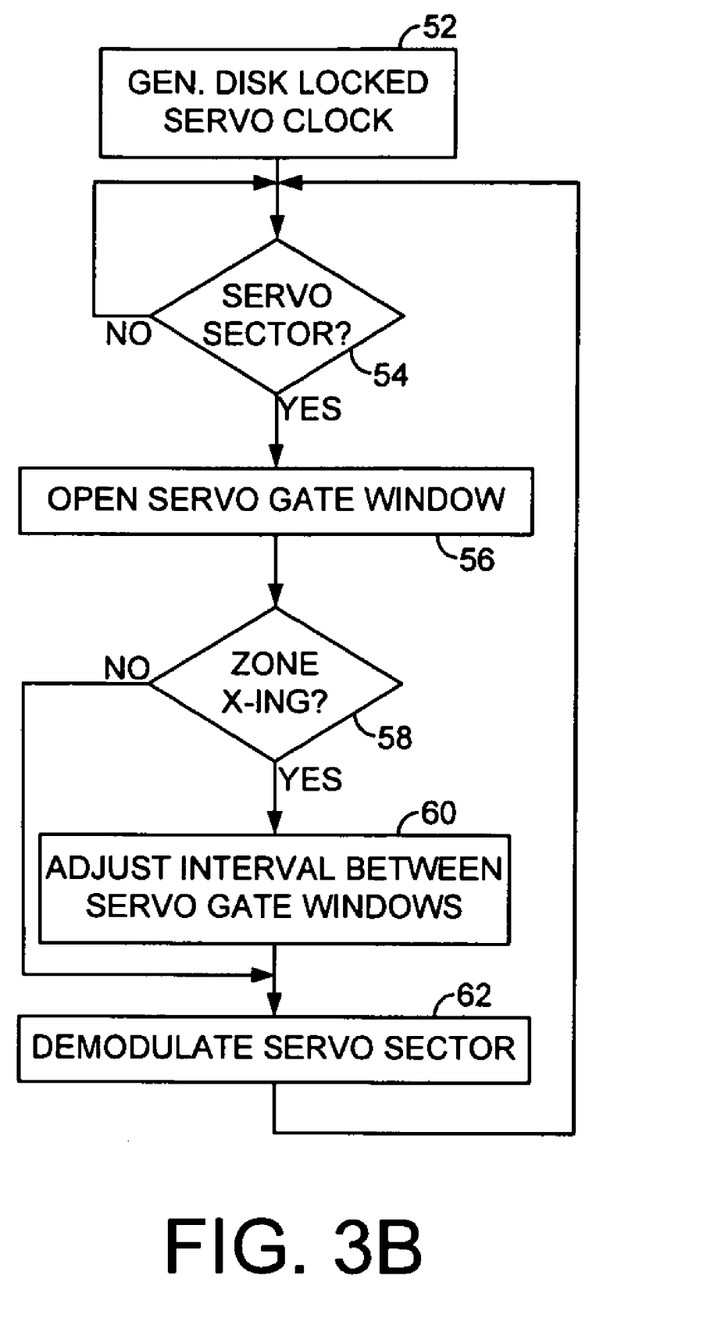
FIG. 3B is a flow diagram according to an embodiment wherein a disk locked servo clock is used to generate the servo gate window, and the interval between servo gate windows is adjusted when the head crosses a servo zone boundary.

FIG. 3B is a flow diagram according to an embodiment of the present invention wherein a disk locked servo clock is generated (step 52), and when the head approaches a servo sector (step 54), the disk locked servo clock is used to open the servo gate window (step 56). When the head crosses a servo zone boundary (step 58), the interval between servo gate windows is adjusted (step 60) to account for the increased recording space between servo sectors, and the servo sector is demodulated (step 62).

Figure 4A:
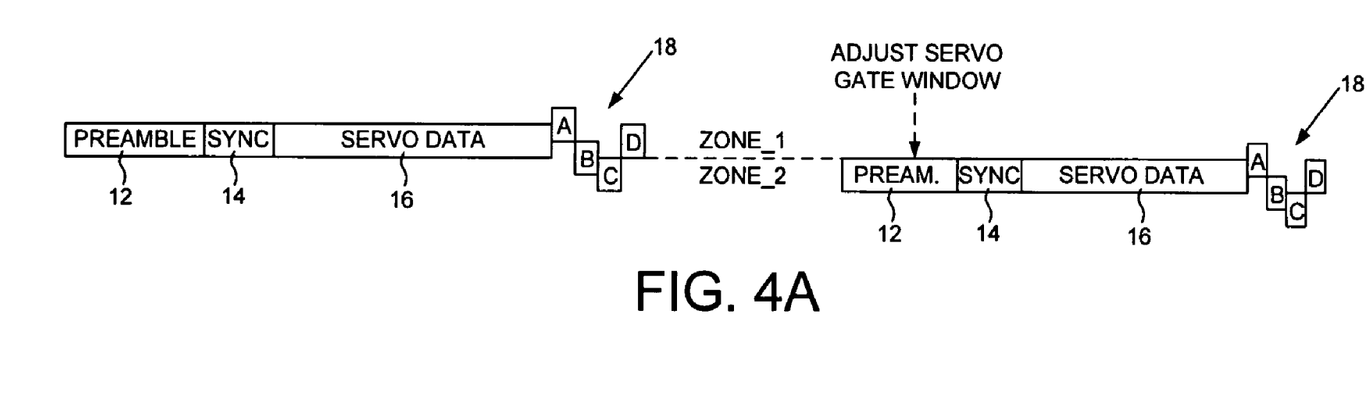
FIG. 4A shows an embodiment of the present invention wherein the servo gate window is adjusted after detecting the preamble in the servo sector of a new servo zone.
Figure 4B:
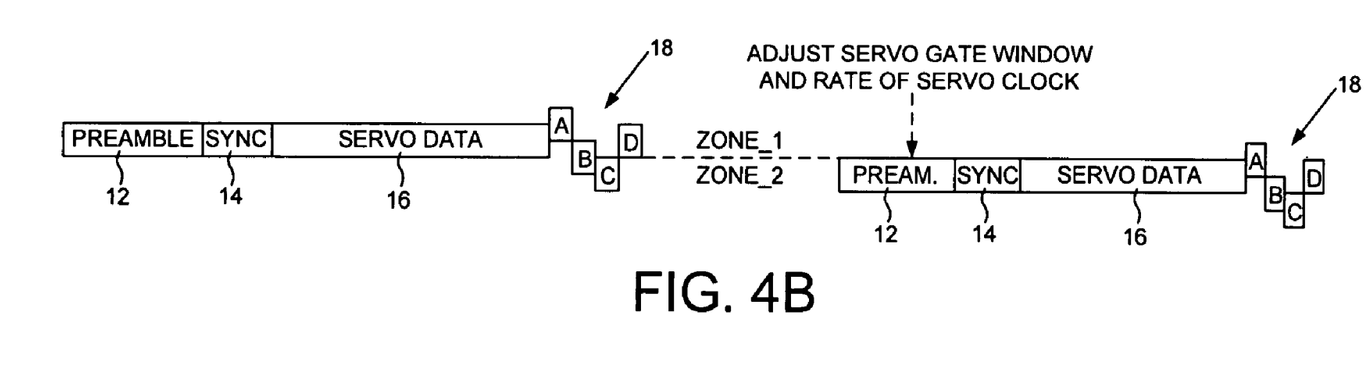
FIG. 4B shows an embodiment of the present invention wherein a rate of the servo clock is adjusted after detecting the preamble in the servo sector of a new servo zone.

FIG. 4A illustrates an embodiment of the present invention wherein when the head crosses from a first servo zone to a second servo zone, the control circuitry 20 adjusts the servo gate window after reading at least part of the preamble in a servo sector in the second servo zone. As described in greater detail below, in one embodiment the preamble 12 is processed to detect when the head has crossed a servo zone boundary, and therefore when the servo gate window needs adjusting. If the servo clock is adjusted relative to the servo data rate of the servo zone (disk locked servo clock), the preamble 12 in the servo sector may be processed in order to adjust the rate of the servo clock relative to the servo data rate of the second servo zone as illustrated in FIG. 4B.

Figure 5:
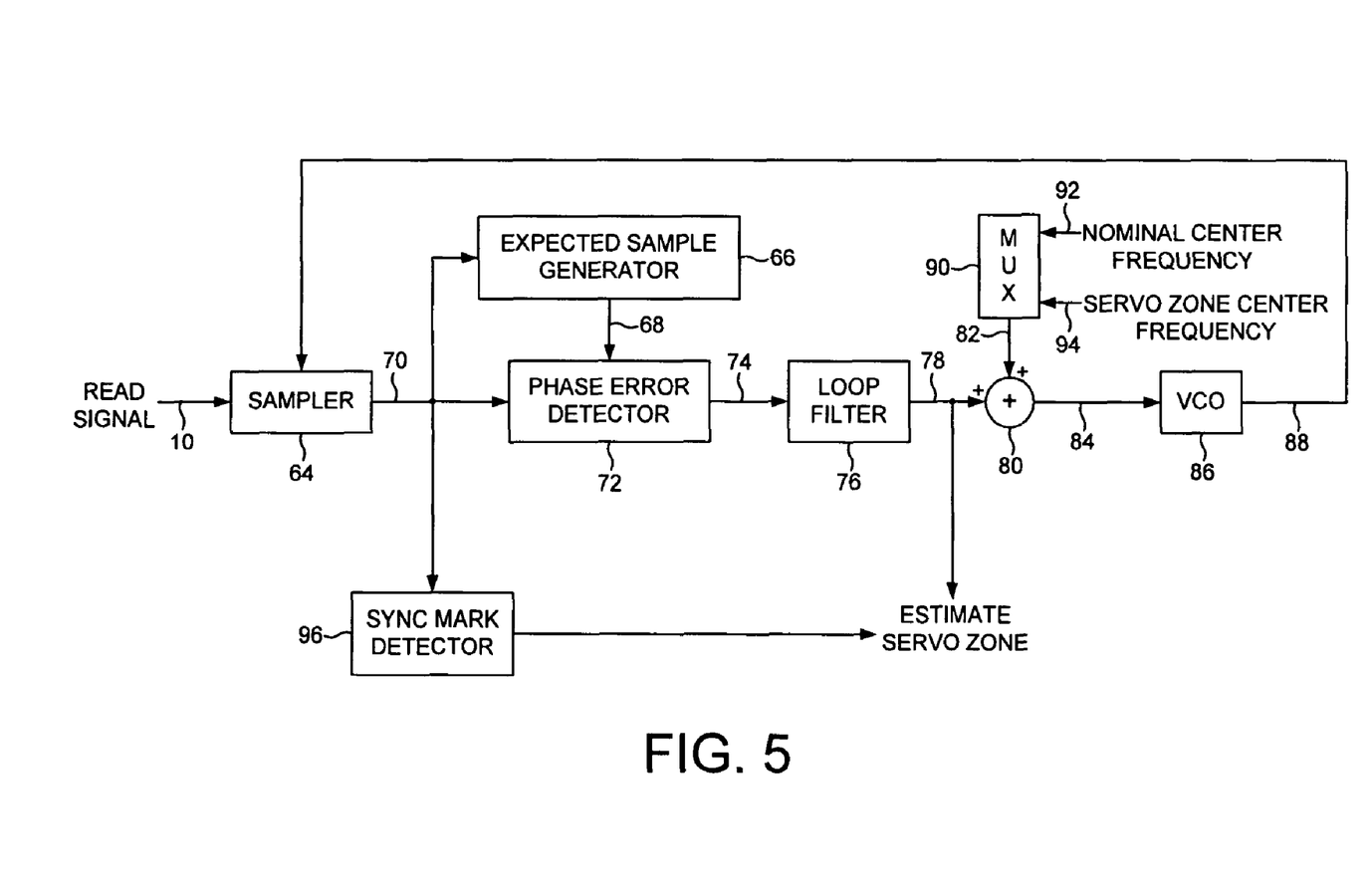
FIG. 5 shows control circuitry according to an embodiment of the present invention for demodulating the servo sectors and for estimating the current servo zone by processing the servo sector preamble.

Any suitable timing circuit for demodulating the servo sectors and for estimating the current servo zone may be employed in the embodiments of the present invention. FIG. 5 shows an example timing circuit comprising a phase locked loop (PLL) for synchronizing a sampling device 64 to the data rate of the read signal 10. An expected sample generator 66 generates expected samples 68 corresponding to a target response (e.g., a suitable partial response) relative to the read signal samples 70. A phase detector 72 generates a phase error 74 in response to the expected samples 68 and the read signal samples 70. The phase error 74 is filtered with a suitable compensation filter 76 to generate a control signal 78. The control signal 78 is added 80 to a center frequency 82 to generate a frequency control signal 84 for a voltage controlled oscillator (VCO) 86. The output 88 of the VCO 86 adjusts the frequency of the sampling device 64 until the read signal 10 is sampled synchronously.

In one embodiment, when the servo zone is estimated initially, a multiplexer 90 selects a nominal center frequency 92 that approximates an average servo data rate out of the plurality of servo zones. Eventually the PLL locks onto the frequency of the preamble 12 that the head is over, and once the servo zone has been identified, the multiplexer 90 selects a center frequency 94 corresponding to the estimated servo zone. Thereafter, when the head 8 crosses a servo zone boundary, the servo zone center frequency 94 is updated after detecting that the head 8 crossed over into a new servo zone.

In one embodiment, the servo zone center frequency 94 is generated using an adjustable frequency synthesizer that is programmed to operate at the frequency of the current servo zone. In one embodiment, when the servo zone center frequency 94 is updated corresponding to the data rate of a new servo zone, the integrator in the compensation filter 76 is cleared to account for the new center frequency 82 added to the control signal 78. Clearing the compensation filter 76 may help the PLL lock faster onto the preamble 12 in the servo sector of the new servo zone.

In one embodiment, the output 88 of the VCO 86 may be used as the servo clock (disk locked servo clock) to generate the servo gate window, and in another embodiment, the nominal center frequency 92 (fixed rate servo clock) may be used to generate the servo gate window. In one embodiment, the fixed rate servo clock may be used to generate the servo gate window while the head is crossing a servo zone boundary. Once the disk locked servo clock locks onto the frequency of the new servo zone (e.g., at the end of a seek operation), the servo gate window may be generated using the disk locked servo clock.

Any suitable technique may be employed to estimate the servo zone in response to the preamble 12, and to adjust the servo gate window in response to the estimated servo zone. In the embodiment of FIG. 5, the control signal 78 of the PLL may be used to estimate a new servo zone. Once the PLL locks onto the frequency of the preamble 12 and a sync mark detector 96 detects the servo sync mark 14 in a servo sector of a new servo zone, the control signal 78 represents the offset from the center frequency 94 of the previous servo zone (the difference between the data rate of the previous servo zone and the data rate of the new servo zone). In one embodiment, the new servo zone center frequency 94 is generated as the frequency control signal 84 applied to the VCO 86 after the servo sync mark 14 is detected. In another embodiment, the new servo zone center frequency 94 is generated from a lookup table indexed by the control signal 78. In one embodiment, the servo zone center frequency 94 is updated after the control circuitry processes the current servo sector of the new servo zone to avoid a timing transient while demodulating the current servo sector.

Other embodiments of the timing circuit may be employed in the embodiments of the present invention, such as an interpolating timing recovery circuit. With interpolated timing recovery, the read signal is sampled asynchronously and the asynchronous read signal samples are interpolated using an interpolation filter to generate the synchronous read signal samples. In one embodiment, the interpolating timing recovery circuit generates a phase error that is filtered to generate a control signal representing the frequency difference between the data rate of the read signal and the sampling frequency, and therefore provides an estimate of the servo zone.

Other embodiments may be employed to estimate the servo zone, such as by recording a unique servo sync mark 14 in the servo sectors of each servo zone. The current servo zone may be estimated by evaluating which servo sync mark 14 is detected. Other embodiments may employ suitable frequency detectors for detecting a frequency of the read signal corresponding to each servo zone.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of servo sectors defining a plurality of servo tracks, and a head actuated radially over the disk for generating a read signal, wherein:
    each servo sector comprises a preamble comprising a first end and a second end;
    each servo sector comprises a servo sync mark after the second end of the preamble;
    the servo tracks form a plurality of servo zones;
    a servo data rate of the servo sectors in a first servo zone is different than a servo data rate of the servo sectors in a second servo zone;
    the first end of the preambles in the servo sectors are aligned along a radius of the disk across at least the first servo zone and the second servo zone;
    the disk drive further comprising control circuitry operable to:
        generate a servo clock;
        open a servo gate window in response to the servo clock when the head approaches one of the servo sectors;
        when the head transitions between the first servo zone and the second servo zone, adjust the servo gate window; and
        demodulate the servo sector,
        wherein the control circuitry is further operable to adjust an end of the servo gate window.

2. The disk drive as recited in claim 1, wherein the servo clock comprises a first rate when opening the servo gate window in the first servo zone and comprises the first rate when opening the servo gate window in the second servo zone.

3. The disk drive as recited in claim 1, wherein the control circuitry is further operable to adjust the servo gate window after reading at least part of the preamble in a servo sector in the second servo zone.

4. A method of operating a disk drive, the disk drive comprising a disk comprising a plurality of servo sectors defining a plurality of servo tracks, and a head actuated radially over the disk for generating a read signal, wherein:
    each servo sector comprises a preamble comprising a first end and a second end;
    each servo sector comprises a servo sync mark after the second end of the preamble;
    the servo tracks form a plurality of servo zones;
    a servo data rate of the servo sectors in a first servo zone is different than a servo data rate of the servo sectors in a second servo zone; and
    the first end of the preambles in the servo sectors are aligned along a radius of the disk across at least the first servo zone and the second servo zone;
    the method comprising:
        generating a servo clock;
        opening a servo gate window in response to the servo clock when the head approaches one of the servo sectors;
        when the head transitions between the first servo zone and the second servo zone, adjusting the servo gate window; and
        demodulating the servo sector,
        wherein adjusting the servo gate window comprises adjusting an end of the servo gate window.

5. The method as recited in claim 4, wherein the servo clock comprises a first rate when opening the servo gate window in the first servo zone and comprises the first rate when opening the servo gate window in the second servo zone.

6. The method as recited in claim 4, further comprising adjusting the servo gate window after reading at least part of the preamble in a servo sector in the second servo zone.

7. A disk drive comprising:
    a disk comprising a plurality of servo sectors defining a plurality of servo tracks, and a head actuated radially over the disk for generating a read signal, wherein:
    each servo sector comprises a preamble comprising a first end and a second end;
    each servo sector comprises a servo sync mark after the second end of the preamble;
    the servo tracks form a plurality of servo zones;
    a servo data rate of the servo sectors in a first servo zone is different than a servo data rate of the servo sectors in a second servo zone; and
    the first end of the preambles in the servo sectors are aligned along a radius of the disk across at least the first servo zone and the second servo zone;
    the disk drive further comprising control circuitry operable to:

generate a servo clock;

open a servo gate window in response to the servo clock when the head approaches one of the servo sectors;

when the head transitions between the first servo zone and the second servo zone, adjust the servo gate window; and demodulate the servo sector, wherein:

the control circuitry is further operable to adjust an interval between servo gate windows;

the servo clock comprises a variable rate adjusted relative to the servo data rate of the servo zone; and the control circuitry is further operable to adjust the rate of the servo clock relative to the servo data rate of the second servo zone after reading at least part of the preamble in a servo sector in the second servo zone.

8. A method of operating a disk drive, the disk drive comprising a disk comprising a plurality of servo sectors defining a plurality of servo tracks, and a head actuated radially over the disk for generating a read signal, wherein:

each servo sector comprises a preamble comprising a first end and a second end;

each servo sector comprises a servo sync mark after the second end of the preamble;

the servo tracks form a plurality of servo zones;

a servo data rate of the servo sectors in a first servo zone is different than a servo data rate of the servo sectors in a second servo zone; and the first end of the preambles in the servo sectors are aligned along a radius of the disk across at least the first servo zone and the second servo zone;

the method comprising:

generating a servo clock;

opening a servo gate window in response to the servo clock when the head approaches one of the servo sectors;

when the head transitions between the first servo zone and the second servo zone, adjusting the servo gate window; and demodulating the servo sector, wherein:

adjusting the servo gate window comprises adjusting an interval between servo gate windows;

the servo clock comprises a variable rate adjusted relative to the servo data rate of the servo zone; and the method further comprises adjusting the rate of the servo clock relative to the servo data rate of the second servo zone after reading at least part of the preamble in a servo sector in the second servo zone.

* * * * *